June 15, 1965     W. J. D. ESCHER     3,189,500
METHOD OF MAKING A COMPOSITE MULTI-WALLED PRESSURE VESSEL
Filed July 27, 1961     4 Sheets-Sheet 1

INVENTOR.
WILLIAM J. D. ESCHER
BY G. O'Brien

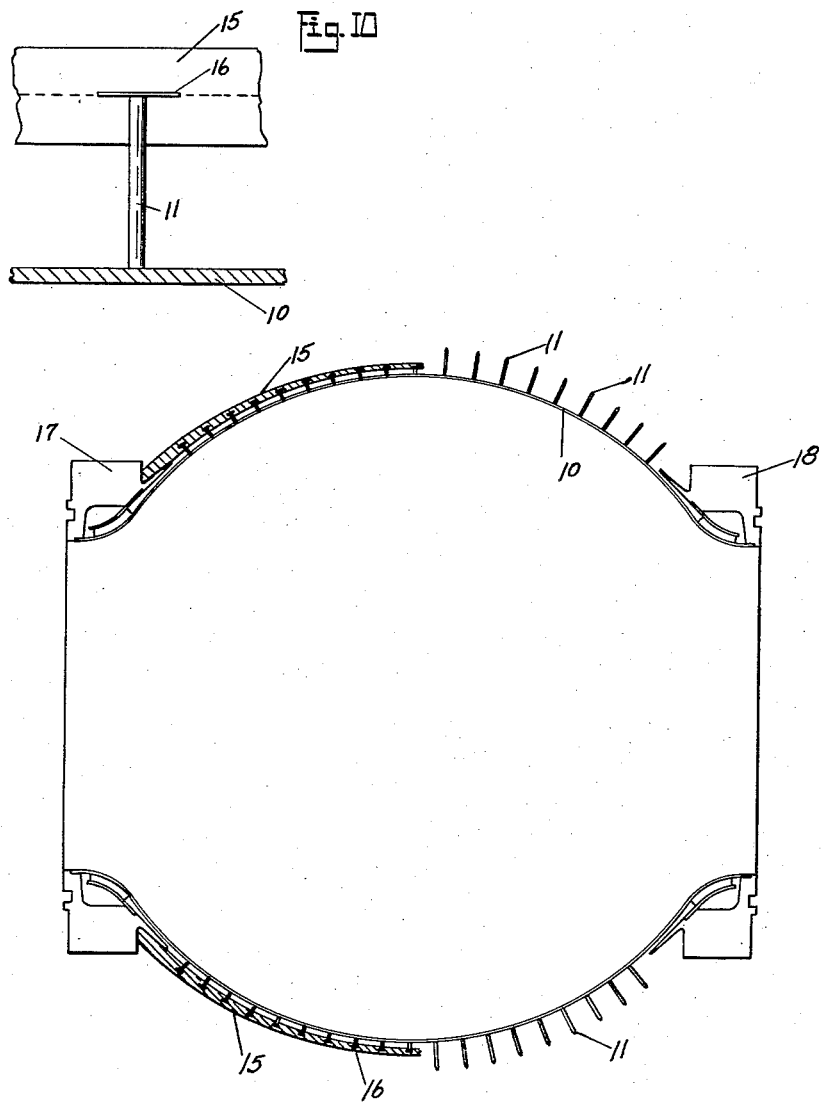

June 15, 1965 W. J. D. ESCHER 3,189,500
METHOD OF MAKING A COMPOSITE MULTI-WALLED PRESSURE VESSEL
Filed July 27, 1961 4 Sheets-Sheet 3

INVENTOR.
WILLIAM J. D. ESCHER
BY

June 15, 1965   W. J. D. ESCHER   3,189,500
METHOD OF MAKING A COMPOSITE MULTI-WALLED PRESSURE VESSEL
Filed July 27, 1961   4 Sheets-Sheet 4

INVENTOR.
WILLIAM J. D. ESCHER
BY

United States Patent Office 3,189,500
Patented June 15, 1965

3,189,500
METHOD OF MAKING A COMPOSITE MULTI-WALLED PRESSURE VESSEL
William J. D. Escher, 4907 Sherwood St.,
Washington 21, D.C.
Filed July 27, 1961, Ser. No. 127,405
3 Claims. (Cl. 156—155)
(Granted under Title 35, U.S. Code (1952), sec. 266)

The invention described herein may be manufactured and used by or for the Government of the United States of America for governmental purposes without the payment of any royalties thereon or therefor.

This invention relates generally to the improved construction of pressure vessels and more particularly relates to improvements in the construction and method of making pressure vessels of the rocket thrust chamber type.

Multiple-wall pressure vessels are generally known to the art and include rocket thrust chambers fabricated with an inner liner wall and an external wall spaced therefrom to provide coolant passages therebetween. Fabricating techniques for these types of constructions include the technique of welding or brazing together a plurality of tubes which are externally wrapped with wire or suitable metallic bands and the technique of externally wrapping a plurality of juxtaposed channels or ribs disposed on a liner. These techniques are complex and time-consuming and require the use of strategic and relatively heavy materials which often do not permit flexibility to achieve design variations in a particular model thrust chamber, e.g. cooling passage cross sectional area.

Accordingly, among the objects of this invention are improvements in the technique of construction that will simplify and economize manufacture and provide increased flexibility in design variation without sacrificing structural strength. A further object of this invention is to provide a practical means of producing a lightweight high performance thrust chamber over a wide range of production rates.

Briefly, in accordance with this invention, there is provided a composite wall construction for a pressure vessel such as a rocket thrust chamber which embodies a relatively thin-walled liner shell surrounded and enclosed by an outer shell of wound fiberglass or other structural filaments, e.g. metal filaments, plastic filaments, etc., disposed in spaced relation from the liner. The liner shell is supported on the outer shell by a plurality of laterally spaced, radially projecting pin members which coact in tension between the shells. During and after winding, the outer shell is sealed by impregnation with a suitable resin which is cured to provide a chamber having an uninterrupted good heat transfer liner surface structurally supported on an outer shell which is capable of containing a coolant at higher than the internal pressure of the chamber. The chamber is fabricated by bonding the pin members to the external surface of the liner shell and then applying a suitable melt-out material to that surface to a depth suitable for the local cooling passage height, which leaves the free extremities of the pin members exposed. Fiberglass filaments are then wound about the solidified melt-out material to a predetermined depth still leaving the free extremities of the pin members exposed, after which suitable head members are mounted on the free extremities of the pin members or equivalent heading means are employed and the winding of the fiberglass filament is completed to a predetermined thickness enclosing the pin members, the melt-out material and the liner shell. The melt-out material is then melted or dissolved and removed and the external, wound roving shell which is impregnated with a suitable resin is cured to seal the space which the melt-out material had occupied. Various items of hardware, including channel-forming ribs, inlet and outlet or manifold members and the like, may be incorporated in the overall structure as the fabrication progresses.

In the drawings:

FIGS. 1, 2, 3 and 4 progressively show the fabrication of a typical pressure vessel in accordance with this invention from inner liner to supporting outer shell with the tension members coacting therebetween;

FIGS. 5 through 10, inclusive, show successively the mounting of a pin on the inner liner in FIG. 5, the application of the melt-out material in FIG. 6, the first stage of winding of fiberglass filaments in FIG. 7, the application or forming of the head member on the pin in FIG. 8, the last stage of winding of filament in FIG. 9, and the removal of the melt-out material in FIG. 10;

FIG. 11 is a diagrammatic, partial sectional view, illustrating two stages in the fabrication of a typical pressure vessel in accordance with this invention;

Figure 1:
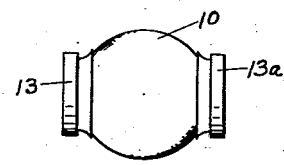
Figure 2:
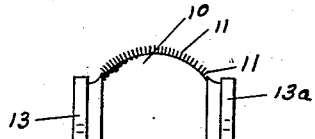
Figure 3:
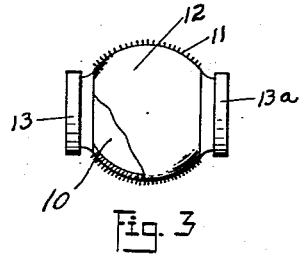
Figure 4:
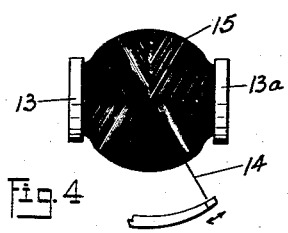
Figure 13:
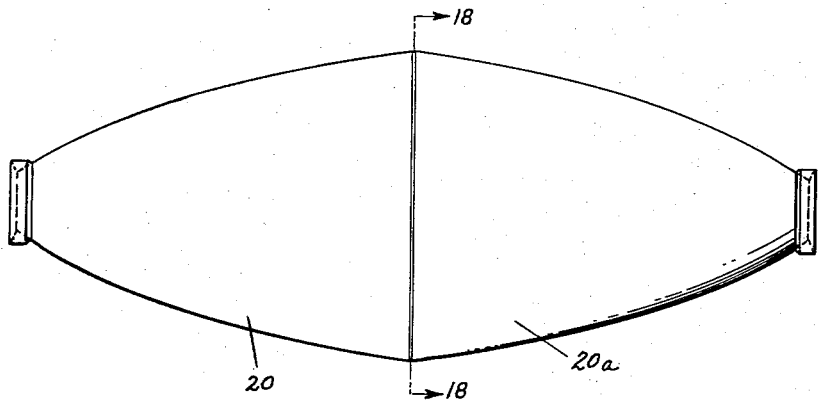
FIG. 13 is a compound assembly of a pair of nozzles for a rocket thrust chamber made in accordance with this invention.
Figure 14:
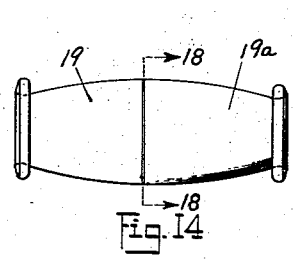
FIG. 14 is a compound assembly of a pair of combustion chambers for a rocket thrust chamber made in accordance with this invention.
Figure 15:
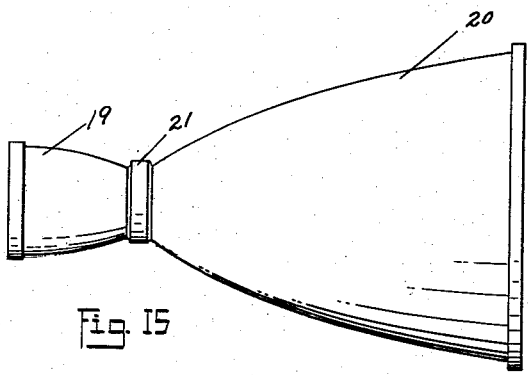
Figure 16:
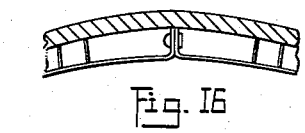
Figure 17:
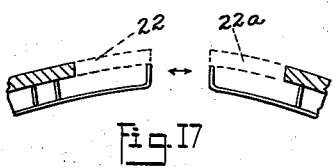
Figure 18:
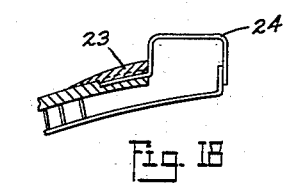
Figure 19:
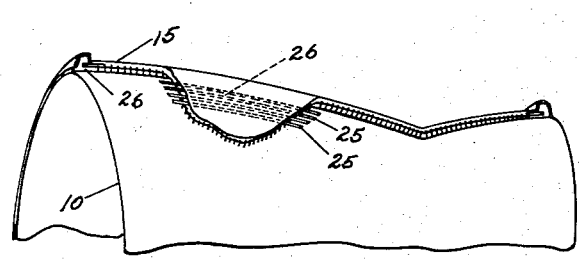

FIG. 15 diagrammatically illustrates an assembly technique for combining a combustion chamber with a nozzle to form a rocket thrust chamber in accordance with this invention;

FIG. 16 is a partial view, in section, taken along lines 18—18 in FIGS. 13 or 14 of the drawings;

FIG. 17 is another view of the structural portion of FIG. 16 illustrating the separation of the nozzle or combustion chamber portions after fabrication is completed;

FIG. 18 is a partial view, in section, of the end of one of the nozzle or combustion chamber portions of FIG. 17 illustrating the mounting of a manifold end-piece thereon;

FIG. 19 is a diagrammatic illustration of a portion of an integral rocket thrust chamber made in accordance with this invention, illustrating the composite wall construction with the liner shell supported in tension on the outer shell in partial section;

Referring now more particularly to FIGS. 1 through 4 of the drawings, there is illustrated a preferred structural embodiment and method of fabrication in accordance with the invention. A liner shell 10 of uninterrupted thin-gauge metal selected to provide a good heat transfer surface and having suitable end-pieces 13 and 13a shown in FIG. 1. The liner shell 10 may be formed in any conventional manner and its external surface milled, for example by etching with a material reactive with the metal, to form suitable welding bosses (not shown) adapted to support tension pins 11 in a manner to be hereinafter more fully described. The welding bosses are preferably milled in a predetermined pattern on the external surface of the liner shell 10 and, for purposes of this description, may be assumed to be uniformly spaced laterally from each other. FIG. 2 of the drawings diagrammatically illustrates the pins 11 disposed radially on the outer surface of the liner shell 10 with one extremity stud-welded or otherwise suitably bonded to the welding bosses on the external surface of the shell 10. Thereafter, as diagrammatically shown in FIG. 3, a suitable melt-out material 12 is applied to the entire external surface of the liner shell 10 to a depth sufficient to leave the free extremities of the pins exposed. The melt-out material 12 may be any suitable material that can be subsequently removed by the application of increased temperature or dissolving agents, and in the preferred embodiment shown, a low melting material, e.g. a bismuth-tin alloy M.P. 281° F. is sprayed onto the liner shell 10. Thereafter, the liner shell 10, with its pins 11 mounted in place and a coating of melt-out material 12 applied to its external surface, is mounted on a suitable mandrel and wound with a resin-impregnated fiberglass filament 14 to provide an outer shell 15 as diagrammatically shown in FIG. 4.

Figure 5:
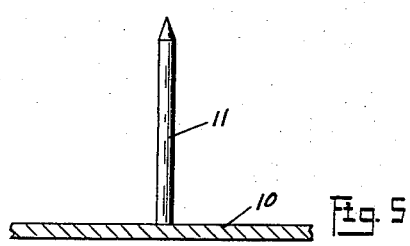
Figure 6:
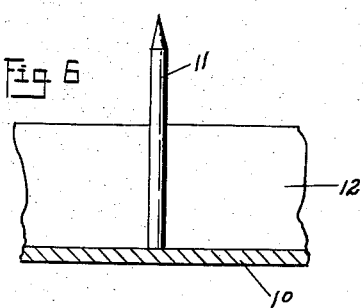
Figure 7:
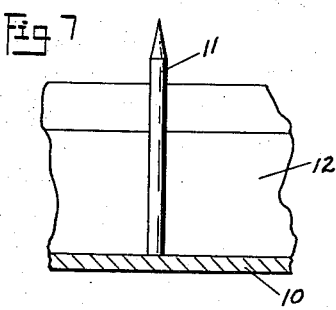
Figure 8:
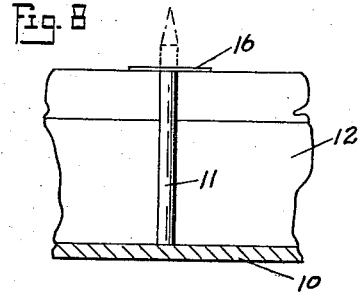
Figure 9:
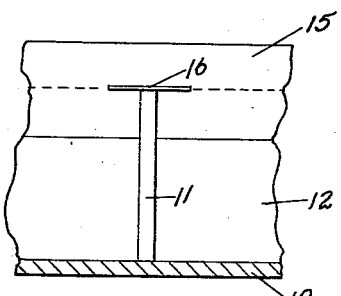

The foregoing steps are also diagrammatically shown in FIGS. 5 through 10 in relation to a portion of a liner shell adjacent one of the pin members, with the successive steps of mounting the pin, applying the melt-out material and then applying the preliminary winding of fiberglass filament shown successively in FIGS. 5, 6 and 7. As best shown in FIGS. 8, 9 and 10 of the drawings respectively, the exposed tips of the pins are then provided with head members 16, which may be conventional push-on type fastening clip. At this point it is possible but not necessary to apply a sealing film of appropriate material to the shell to act as a barrier to liquid or gas leakage under subsequent conditions wherein the cooling passage is pressurized. A succeeding winding of fiberglass filament is then applied to enclose and bind the pin members and their heads in tension between the liner shell and the wound filaments of fiberglass; and finally, the melt-out material is removed from the space between the outer shell 15 formed by the successive windings of fiberglass filaments and the liner shell 10 by applying suitably high temperature or a dissolving agent to the material in a manner well known to those skilled in the art. Instead of push-on clips, the ends of the pins may be split and spread to form heads.

Thereafter, the outer shell may be further impregnated with a suitable resin, such as an epoxy resin (reaction product of bisphenol A with epichlorohydrin, and reactively cured with a polyamine), as a finish surface, and the entire composite wall assembly cured to seal the space between the outer and liner shells and to provide structural strength and rigidity to the shell. The curing of the resin-impregnated fiberglass filament outer shell may be accomplished simultaneously with the removal of the melt-out material by appropriate application of heat. Instead of the epoxy resins, which are preferred for the purposes hereof, other thermosetting impregnating resins, e.g. phenol-formaldehyde; amino-plast resins, e.g. melamine-aldehyde resins, silicone resins and polyesters may be used.

Figure 12:
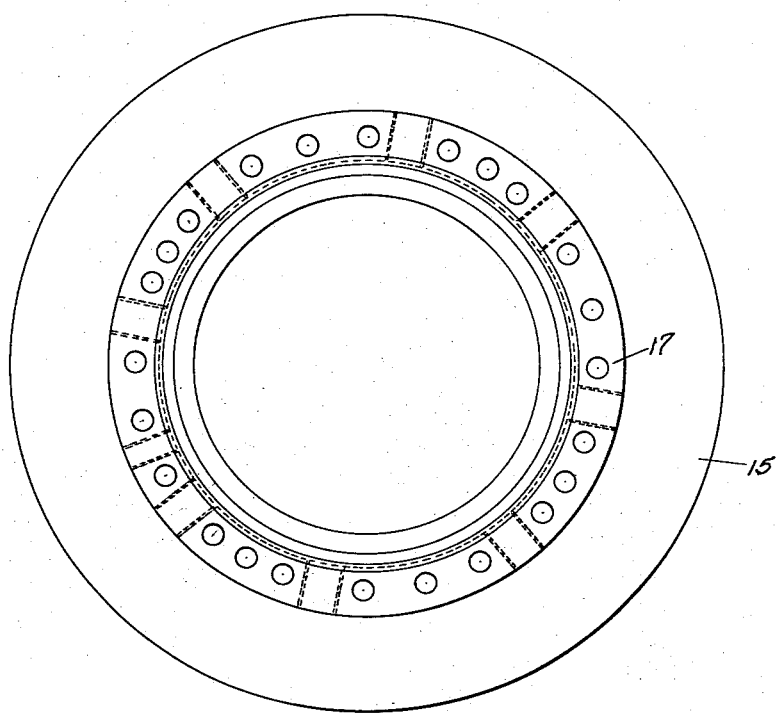
FIG. 12 is an end view of the pressure vessel of FIG. 11.

The resulting composite structure is diagrammatically shown in partial section in FIGS. 11 and 12 of the drawings, which show a portion of the liner shell 10 prior to the construction of the external or outer shell and another portion with the outer shell in place. Suitable end-pieces 17 and 18 which form manifolds at each end of the vessel are shown mounted in place; such end-pieces being put in place after the pin members 11 have been welded to the liner shell 10 and before the application of the melt-out material 12 and outer shell 15 of fiberglass filaments. These end-piece manifolds do not form part of this invention but are merely illustrated herein to complete the pressure vessel and show the manner in which the coolant material may be supplied to and removed from the space between the liner shell and the outer shell when in use.

While the fabrication technique and resulting structural embodiment is applicable to any type of pressure vessel, such as jacketed storage tanks, heat exchangers, and other types of combustion units, the present invention is principally concerned with the fabrication of rocket thrust chambers and a technique for fabricating such chambers is progressively illustrated in FIGS. 13 through 18, inclusive, of the drawings. As distinguished from the conventional pressure vessel illustrated in FIGS. 1 through 4 and 11 and 12, the rocket thrust chamber type of pressure vessel has a predetermined variable surface configuration as shown in FIG. 15 to provide a combustion chamber 19 at one end and a thrust nozzle 20 at the other end, both integrally joined through a reduced diameter throat portion 21.

In accordance with this invention, a preferred technique for assembling the component parts of a rocket thrust chamber consists of making a sub-assembly of a pair of nozzle portions 20 and 20a in back-to-back relation as best shown in FIG. 13 and another sub-assembly of the combustion chamber portions 19 and 19a in back-to-back relation as best shown in FIG. 14. Each of these sub-assemblies are then fabricated in the manner hereinbefore described to provide the composite double-wall construction of a liner shell supported by pin members or spokes in tension on a primary structural member in the form of an external or outer shell of wound fiberglass filaments. As best shown in FIG. 16, the parts of the sub-assemblies are preferably joined together at their wide-mouth extremities by any suitable means and after the pin members and outer shell are applied, the sub-assembly is separated as shown in FIG. 17 and various hardware items, such as manifold end-pieces, are applied as best shown in FIG. 18 of the drawings. The end portions of the outer shell are cut away as shown by the dotted lines 22 and 22a in FIG. 17, and when the end-piece 24 is placed in position as shown in FIG. 18, a further winding 23 of resin-impregnated fiberglass filament secures the end-piece in place.

Whether the rocket thrust thrust chamber is fabricated in accordance with the technique shown and described in connection with FIGS. 13 through 18 inclusive, or integrally formed as a single unit as shown in FIG. 19, it is possible but not necessary to form coolant passages 26 extending axially along the outer surface of the liner shell in the space between the liner shell 10 and the outer shell 15. These passages may be formed by mounting suitable longitudinal metal strips 25 in juxtaposed spaced relation about the external surface of the liner shell, each metal strip having a depth corresponding to the depth of the space between the liner shell and the outer shell, thereby forming juxtaposed channels (FIG. 19). Such channels may also be formed as hereinbefore noted by forming ribs or other wall-separators around the periphery of the liner shell. When the outer shell 15 is applied, coolant fluid may be supplied through the manifold at one extremity of the rocket thrust chamber and passed along the surface of the liner shell through the appropriate channels for removal or injection at the other extremity as a liquid propellant.

Thus, there has been provided in accordance with this invention, a composite, multi-walled pressure vessel consisting of an uninterrupted heat transfer surface formed by a liner shell which is in turn supported on pins or spokes in tension on a lightweight outer shell having sufficient structural strength to contain a gaseous or liquid coolant or propellant in passages formed therebetween at a pressure higher than the combustion chamber pressure. The fabrication is economical and simple and permits flexibility in design, and the resulting improved construction is relatively light in weight and employs non-strategic materials in a manner that does not sacrifice structural strength or other desirable mechanical characteristics required in the normal application of such vessels.

I have shown and described what I consider to be the preferred embodiment of my invention along with suggested modifications, and it is clear that other changes and modifications may be made by those skilled in the art without departing from the scope of my invention as defined by the appended claims.

I claim:

1. The method of forming a composite multi-walled pressure vessel consisting of, providing a relatively thin-walled liner shell, bonding a plurality of substantially rigid pin members to the liner shell exterior in laterally spaced and radially disposed relation, applying a melt-out material to the liner shell exterior, winding a resin-impregnated filament about the melt-out material to a depth less than the axial length of said pin members, applying head means to the exposed extremities of said pin members, winding another resin-impregnated filament about the first mentioned filament and enclosing the headed pin members in interlocked relation therein to provide an outer shell, impregnating the outer surface of the other filament with a sealing material, curing the resin-impregnated filaments to provide a substantially rigid composite and multi-walled vessel with a liner shell supported in tension on the outer shell, and removing the melt-out material to form a space between the liner shell and the filaments.

2. The method of concurrently forming a pair of independent composite multi-walled pressure vessel sections consisting of, removably assembling a pair of relatively thin-walled liner shells in end-to-end relation, bonding a plurality of substantially rigid pin members to the exterior of each liner shell in laterally spaced and radially disposed relation, applying a melt-out material to the combined exterior of the assembled liner shells, winding a resin-impregnated filament about the melt-out material to a depth less than the axial length of said pin members, applying head members to the exposed extremities of said pin members, winding another resin-impregnated filament about the first mentioned filament and enclosing the headed pin members in interlocked relation therein to provide an outer shell, melting out the melt-out material to form a space between the liner shell and the filaments, impregnating the outer surface of the other filament with a sealing material, curing the resin-impregnated filaments to provide a substantially rigid assembly of composite multi-walled vessel sections with liner shells supported in tension on an outer shell, removing a circumferential portion of the outer shell adjacent the abutting ends of the assembled sections, separating the assembled vessel sections, and finishing the exposed ends of each section by mounting an end-piece on each respectively and then binding the end-pieces to the respective sections by winding and curing a resin-impregnated flexible filament thereon.

3. A method of forming a pressure vessel of the type having a liner shell spaced inwardly from an outer shell, comprising the steps of bonding a plurality of outwardly extending rigid members to the exterior surface of the liner shell, applying a melt-out material to the exterior surface of the liner shell between the rigid members, winding a resin-impregnated filament about the melt-out material to a depth less than the axial length of the rigid members, providing a head for the exposed extremity of each of the rigid members, winding an additional resin-impregnated filament about the first mentioned filament and enclosing the headed members in interlocked relation therein to form the outer shell, curing the resin-impregnated filament to provide a composite with the liner shell supported in tension on the outer shell, and removing the melt-out material to form a space between the liner shell and the outer shell.

References Cited by the Examiner
UNITED STATES PATENTS

| | | | |
|---|---|---|---|
| 2,686,400 | 8/54 | Andrus | 60—35.6 |
| 2,744,043 | 5/56 | Ramberg | 156—155 |
| 2,933,888 | 4/60 | Africano et al. | 60—35.6 |
| 2,956,399 | 10/60 | Beighley | 60—35.6 |
| 3,021,241 | 2/62 | Schneiderman et al. | 156—173 |

EARL M. BERGERT, *Primary Examiner.*

S. LEVINE, *Examiner.*